(12) United States Patent
Han et al.

(10) Patent No.: US 12,723,812 B2
(45) Date of Patent: Sep. 1, 2026

(54) HEAT TREATMENT APPARATUS FOR MANUFACTURING ACTIVE MATERIAL FOR SECONDARY BATTERY

(71) Applicant: HANWHA MOMENTUM CORPORATION, Seongnam-si (KR)

(72) Inventors: Dong Ho Han, Seoul (KR); Shin Ho Lee, Seoul (KR); Jin Hyeok Lee, Seoul (KR); Young Jin Lim, Seoul (KR); Tae Ho Kang, Seoul (KR); Sung Min Kwon, Seoul (KR)

(73) Assignee: HANWHA MOMENTUM CORPORATION, Seoul (KR)

( * ) Notice: Subject to any disclaimer, the term of this patent is extended or adjusted under 35 U.S.C. 154(b) by 260 days.

(21) Appl. No.: 18/234,940

(22) Filed: Aug. 17, 2023

(65) Prior Publication Data

US 2024/0159466 A1 May 16, 2024

(30) Foreign Application Priority Data

Nov. 11, 2022 (KR) ........................ 10-2022-0150960
Nov. 22, 2022 (KR) ........................ 10-2022-0157176

(51) Int. Cl.
*F27B 9/24* (2006.01)
*F27B 9/30* (2006.01)
(Continued)

(52) U.S. Cl.
CPC .......... *F27B 9/2407* (2013.01); *F27B 9/3005* (2013.01); *F27B 9/36* (2013.01);
(Continued)

(58) Field of Classification Search
CPC .......... F27B 9/028; F27B 9/20; F27B 9/3005; F27B 9/24; F27B 9/262; F27B 9/02;
(Continued)

(56) References Cited

U.S. PATENT DOCUMENTS 7,413,592 B2 * 8/2008 Bleifuss .................. C21B 11/08
75/485
12,085,339 B2 * 9/2024 Yang ......................... F27B 9/26
(Continued)

FOREIGN PATENT DOCUMENTS

CN 111426186 A * 7/2020 ............. F27D 17/20
KR 10-0009592 B1 4/1981
(Continued)

OTHER PUBLICATIONS

Communication issued Mar. 18, 2024 by the European Patent Office in European Patent Application No. 23197591.3.

*Primary Examiner* — Gregory A Wilson
(74) *Attorney, Agent, or Firm* — Sughrue Mion, PLLC

(57) ABSTRACT

A heat treatment apparatus includes a furnace body, a roller inside the furnace body, a heater inside the furnace body, an upper and lower discharge pipes on the furnace body, and a lower supply pipe on the lower part of the furnace body. The furnace body includes areas having the upper and lower discharge pipes, the areas including a first area to an Nth area disposed sequentially along a second direction being a transport direction of each of the materials, a length of the first area in the second direction is shorter than lengths of the second area to the Nth area in the second direction, and in each of the first area to the Nth area, the upper discharge pipe and the lower supply pipe are not arranged in a straight line in a third direction being a height direction to be misaligned from each other.

15 Claims, 6 Drawing Sheets

(51) Int. Cl.
*F27B 9/36* (2006.01)
*F27D 5/00* (2006.01)
*H01M 4/04* (2006.01)

(52) U.S. Cl.
CPC .... *F27D 5/0068* (2013.01); *F27B 2009/3638* (2013.01); *H01M 4/0471* (2013.01)

(58) Field of Classification Search
CPC .............. F27B 9/029; F27B 2009/3638; F27D 5/0006; F27D 5/0012
See application file for complete search history.

(56) References Cited

U.S. PATENT DOCUMENTS

| | | | | |
|---|---|---|---|---|
| 12,117,242 | B2 * | 10/2024 | Jung | F27B 9/02 |
| 2022/0065534 | A1 | 3/2022 | Jung et al. | |

FOREIGN PATENT DOCUMENTS

| | | | | |
|---|---|---|---|---|
| KR | 20110068077 | A * | 6/2011 | F27B 9/10 |
| KR | 10-1425213 | A | 8/2014 | |
| KR | 10-1427537 | B1 | 8/2014 | |
| KR | 101993209 | B1 * | 6/2019 | F27B 9/02 |

* cited by examiner d5≤d6, d7≥d8
d11<d10<d9

HEAT TREATMENT APPARATUS FOR MANUFACTURING ACTIVE MATERIAL FOR SECONDARY BATTERY

CROSS-REFERENCE TO RELATED APPLICATION AND CLAIM OF PRIORITY

This application claims the benefit under 35 USC § 119 of Korean Patent Application Nos. 10-2022-0150960 filed on Nov. 11, 2022, and 10-2022-0157176 filed on Nov. 22, 2022, in the Korean Intellectual Property Office (KIPO), the entire disclosure of which are incorporated herein by reference for all purposes.

BACKGROUND

1. Field of the Invention

The present disclosure relates to a heat treatment apparatus for manufacturing an active material for a secondary battery in which a temperature distribution state inside a furnace is improved through the size of the furnace and the arrangement relationship of saggers for transporting materials.

2. Description of the Related Art

In general, a heat treatment furnace is a device used for the purpose of improving physical properties by applying high-temperature heat to metal or non-metal materials, and includes a combustion furnace that generates heat by burning coal, oil, and gas according to a heat source, an electric furnace that uses an electric heater, and a radiant tube furnace that uses radiant heat transfer. The heat treatment furnace is divided into a continuous roller hearth type heat treatment furnace and a batch type heat treatment furnace according to the flow of a material, and is used in various fields such as sintering of ceramic, sintering of metal and ceramic, sintering of indium tin oxide (ITO) powder, firing of enamel, and firing of secondary battery materials, etc.

Among them, the continuous roller hearth type heat treatment furnace includes a preheating zone for preheating a material at room temperature to around 100° C., a maintenance zone for maintaining the material preheated in the preheating zone at a high temperature, and a cooling zone for cooling the heat treated material, and atmospheric gas is mainly used as gas supplied to the preheating zone and the maintenance zone.

As the conventional continuous roller hearth type heat treatment furnace, a tunnel kiln is disclosed in Korean Patent No. 10-0009592. The Korean Patent discloses the tunnel kiln in which firing of materials is performed by providing a space as a combustion chamber between the materials to be fired loaded in a bogie for firing, wherein a heater and a circulation fan outside the furnace are installed between a circulating gas inlet on the low-temperature side of a preheating zone and a gas discharge outlet on the high-temperature side thereof, a duct for communicating the heater and circulation fan with the inside of the furnace of the preheating zone is installed, the circulation fan is installed outside the furnace of the cooling zone, and the circulation fan and the inside of the furnace of the cooling zone are communicated with each other by a base material of the duct.

SUMMARY

Accordingly, the present disclosure has been made keeping in mind the above problems occurring in the related art, and the present disclosure is intended to propose a heat treatment apparatus for manufacturing an active material for a secondary battery in which an internal atmosphere in which materials are heat-treated can be maintained to be uniform through the size of a furnace and the arrangement relationship of saggers for transporting the materials.

In addition, the present disclosure is intended to propose a heat treatment apparatus for manufacturing an active material for a secondary battery in which arrangement relationship between a supply pipe and a discharge pipe responsible for supplying and discharging atmospheric gas is improved so that supplied atmospheric gas and a material received in the sagger can sufficiently react with each other.

In order to achieve the above objectives, according to one aspect of the present disclosure, there is provided a heat treatment apparatus including: a furnace body in which materials are transferred and heat treated; a roller disposed inside the furnace body and configured to transfer saggers in which the materials are received; a heater disposed inside the furnace body, the heater being disposed at a position spaced apart from the saggers and configured to heat the materials; an upper discharge pipe disposed on an upper part of the furnace body; a lower discharge pipe disposed on a lower part of the furnace body; and a lower supply pipe disposed on the lower part of the furnace body, wherein the furnace body includes a plurality of areas having the upper and lower discharge pipes, the plurality of areas including a first area to an Nth area (N is a natural number greater than or equal to 2) disposed sequentially along a second direction which is a transport direction of each of the materials, a length of the first area in the second direction is shorter than lengths of the second area to the Nth area in the second direction, and in each of the first area to the Nth area, the upper discharge pipe and the lower supply pipe are not arranged in a straight line in a third direction which is a height direction to be misaligned from each other.

According to the heat treatment apparatus of the present disclosure, the discharge pipes for discharging gas inside the furnace are formed in an upstream section of a maintenance zone and a heating zone, thereby facilitating gas discharge in the furnace.

According to the present disclosure, the lower discharge pipe is formed on the bottom of the furnace, thereby efficiently discharging carbon dioxide generated during the manufacturing process of a cathode active material for a secondary battery.

According to the present disclosure, the lower discharge pipe is formed at the center of the bottom of the furnace and a plurality of upper discharge pipes are formed on the ceiling of the furnace, and thus the atmosphere inside the furnace can be maintained uniformly. In addition, the furnace can be expanded to have a wide internal space within the range of maintaining a uniform atmosphere inside the furnace due to the plurality of upper discharge pipes, thereby enabling a large number of materials to be heat-treated at once.

In order to simultaneously heat-treat a plurality of materials, a sagger may be used as a means of stacking each of the materials. In this case, an opening part is formed in the side surface of the sagger, and thus atmospheric gases such as air or oxygen supplied from the outside may efficiently contact the materials and cathode active materials for a secondary battery may be efficiently generated on the materials.

In the heat treatment apparatus of the present disclosure, a first distance which is a distance between inner walls of a width direction (a first direction) which is an x-axis direction of the furnace, a second distance which is the distance of each of the saggers in the first direction of the furnace, a third distance which is a distance between each of the opposite ends of the sagger and each of the inner walls of the furnace, a fourth distance which is a distance between sagger unit bodies formed in one pair of rows and a plurality of layers among saggers disposed in a plurality of rows and layers, a first height which is a height between the center of the roller and an uppermost surface of a ceiling surface inside the furnace along the third direction which is a z-axis direction, and a second height which is the height of the saggers stacked in a plurality of layers along the second direction, which is the z-axis direction, are preset to have ratio relationships therebetween. By satisfying these preset conditions, a uniform atmosphere in which temperature deviation, gas distribution deviation, and gas pressure deviation, etc. are maintained to be constant is formed, thereby improving the yield of materials.

According to the present disclosure, in the heat treatment apparatus consisting of a plurality of zones, through an arrangement relationship between the supply pipe and the discharge pipe respectively supplying and discharging atmospheric gas, an upper heater, and a lower heater, the flow distance of the atmospheric gas supplied through the supply pipe may be increased, thereby securing sufficient reaction time of the atmospheric gas with a material, and providing a uniform heat source thereto so that the improvement of product quality can be promoted.

In addition, the heat treatment apparatus of the present disclosure includes the furnace body including a plurality of areas. When the plurality of areas consists of the first area to the Nth area, a first length, which is a second directional length, which is the moving direction of a material in the first area, is the shortest; a second length which is a first directional length in each of the second area to the Nth area is longer than, the same as, or similar to the first length of the first area; and a fourth length which is the second directional length between an upper discharge pipe and a lower supply pipe in the second area or the second area to the Nth area is longer than a third length which is the second directional length between an upper discharge pipe and a lower supply pipe in the first area, and accordingly, a path through which an atmospheric gas supplied through the lower supply pipe is discharged through the upper discharge pipes is long, so the reaction time of the atmospheric gas with a material in a sagger introduced into the furnace body increases so that the atmospheric gas reacts sufficiently with the material, thereby enabling good quality products to be produced.

According to the present disclosure, the discharge pipe formed in each of the plurality of areas may include the lower discharge pipe in addition to the plurality of upper discharge pipes, and thus when gas is not discharged efficiently through the upper discharge pipes alone, the gas may be discharged through the lower discharge pipe, so the heat treatment of a material may not be affected adversely.

In addition, according to the present disclosure, through a correlation between the arrangement positions of the upper discharge pipes, the lower supply pipe, the upper heater, and the lower heater in the first area and the second area to the Nth area, atmospheric gas supplied through the lower supply pipe and discharged through the upper discharge pipes can flow evenly and a uniform heat source can be provided to a material inside the sagger.

In addition, according to the present disclosure, impurity gas generated after atmosphere gas reacts with a material can be efficiently discharged to the outside, and the partial pressure of oxygen can be appropriately controlled.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, embodiments of the present disclosure will be described in detail with reference to the accompanying drawings. However, the technical idea of the present disclosure is not limited to some of the described embodiments, but may be implemented in various forms. At least one component in the embodiments may be selectively combined and/or substituted within the scope of the technical idea of the present disclosure.

In addition, terms in the embodiments of the present disclosure may be interpreted in terms that can be generally understood by those skilled in the art, unless specifically defined, and generally used terms are interpreted in consideration of the contextual meaning of the related technology.

In addition, the terms of the embodiments of the present disclosure are for description of the embodiments and do not limit the present disclosure, and singular forms may be interpreted as including plural forms unless the context clearly indicates otherwise.

In addition, in the components of the embodiments of the present disclosure, terms such as first, second, and third, or A, B, and C, etc. may be used, and these terms are only for distinguishing one component from other components and does not limit order or sequence thereof.

In addition, in the embodiment of the present disclosure, when one component is described as "connected", "bonded", and "coupled", etc. to another component, it may mean that the one component is directly connected, bonded, or coupled to the another component, and two components are indirectly connected, bonded, or coupled to each other by another component therebetween.

In addition, in the embodiment of the present disclosure, the placement, formation, and positioning of one component on, beneath, above, or under another component may mean that the one component is directly or indirectly placed, formed, or positioned on, above, or under the another component. Expressions such as up or down, and an upper or lower side may mean not only an upward direction but also a downward direction with respect to one component.

A continuous roller hearth type heat treatment apparatus according to the present disclosure includes a preheating zone in which a material is transferred by using a roller and is preheated, a maintenance zone in which the material preheated in the preheating zone is heat treated at high temperature, and a cooling zone in which the high temperature material is cooled. A heating zone is formed between the preheating zone and the maintenance zone to heat a material to a high temperature. In the preheating zone and the heating zone, room temperature gas and preheated gas are injected into a furnace (a heat treatment furnace), and a supply pipe is formed on the bottom surface of the furnace and a discharge pipe is formed on the ceiling of the furnace in a direction in which high temperature gas moves so that a material to be treated reacts efficiently to atmospheric gas.

Figure 1:
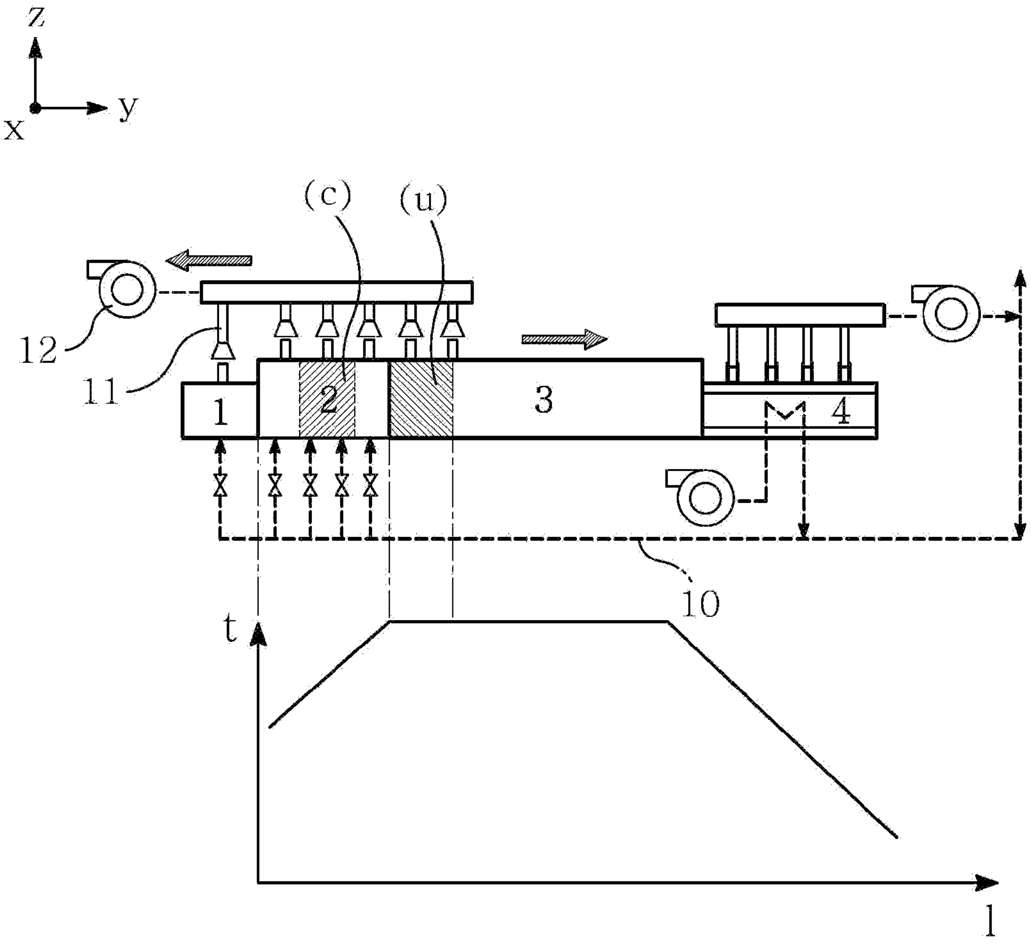
FIG. 1 is a schematic diagram of the entire configuration of the present disclosure.
Figure 2:
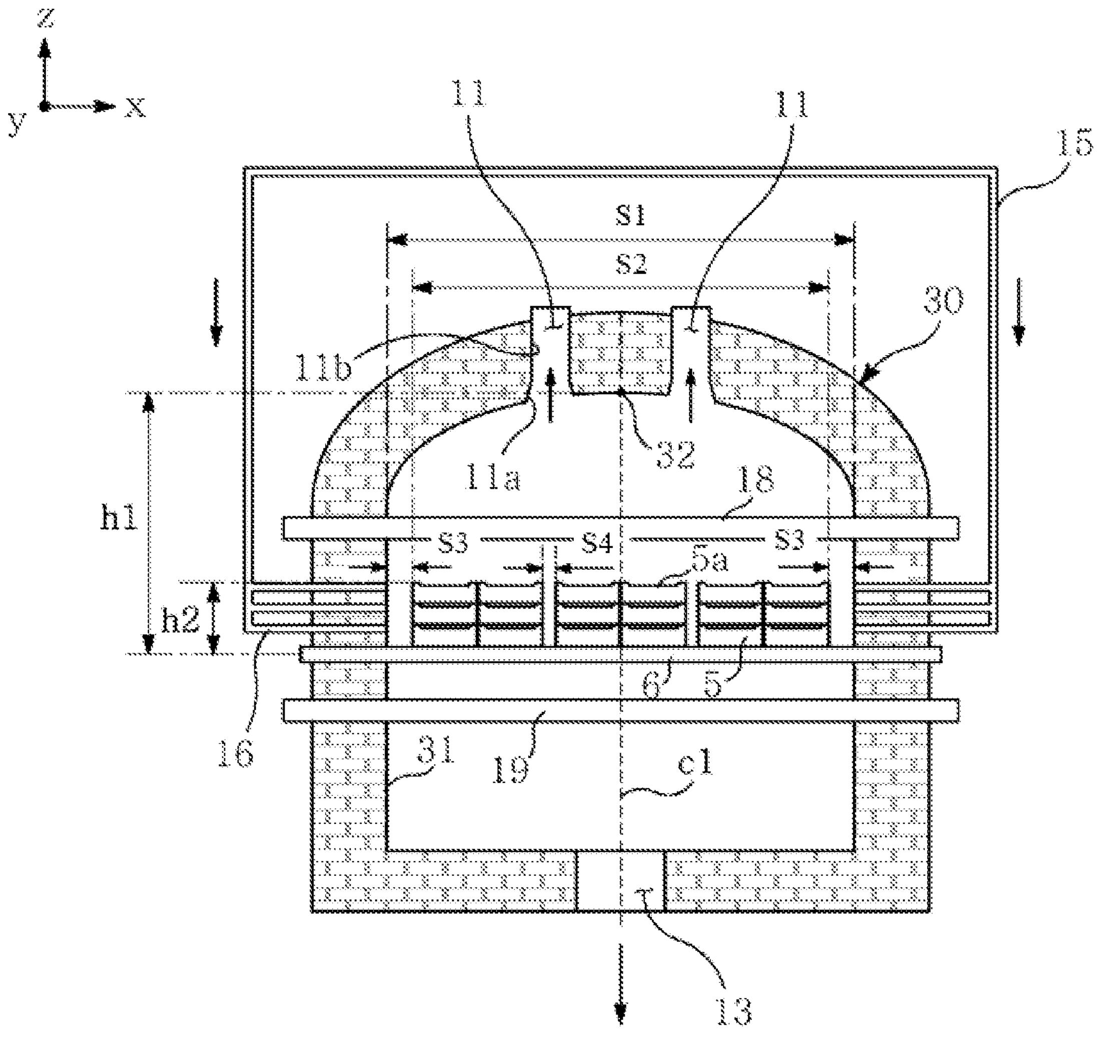
FIG. 2 is a cross-sectional view of a heat treatment apparatus of the present disclosure.

FIG. 1 is a schematic diagram of the entire configuration of the present disclosure, and FIG. 2 is a cross-sectional view of the heat treatment apparatus of the present disclosure.

Referring to FIGS. 1 and 2, the present disclosure relates to the heat treatment apparatus including: the preheating zone 1 configured to transfer and preheat a material, the maintenance zone 3 configured to perform high temperature heat treatment on the material preheated in the preheating zone 1, and the cooling zone 4 configured to cool the high temperature material. The heating zone 2 is formed between the preheating zone 1 and the maintenance zone 3 to heat a material to a high temperature. In the preheating zone 1 and the heating zone 2, high temperature gas may be injected into a furnace constituting the heat treatment apparatus.

The supply pipe 10 through which high temperature gas is supplied is formed on the bottom surface of the furnace, and an upper discharge pipe 11 is formed on the ceiling of the furnace so that power loss due to gas circulation is minimized.

The roller 6 for transporting a material may be provided inside the furnace, the conveying speed of the material may be easily adjusted, and uniform heat treatment on the material may be performed regardless of the front, rear, upper, or lower side of the material.

In addition, a top surface inside a furnace body 30 may be formed as a flat or curved surface. For example, when the top surface inside the furnace body 30 is formed as a curved surface as in the embodiment of the present disclosure, the exhaust properties of a fluid can be improved. That is, it is possible to prevent the occurrence of turbulence during the flow of a fluid and secure the residence time of a fluid for heat treatment.

A material is usually heated to around 100° C. in the preheating zone 1. At this time, the material is preheated by using a high-temperature gas around 120° C.

In the graph of FIG. 1, a horizontal axis may represent length 1, and a vertical axis may represent a temperature t.

In the heating zone 2, the temperature of a material is raised to 950 to 1250° C. by an electric heater, and next, in the maintenance zone 3, heat treatment is performed by maintaining the temperature of the material at a temperature similar to the temperature of the material in the heating zone 2, and finally, in the cooling zone 4, the material may be cooled by using low-temperature gas.

High-temperature gas after being used for cooling a material in the cooling zone 4 is injected into the preheating zone 1 and the heating zone 2, and a separate heating device may be provided to increase the temperature of the gas when necessary.

The supply pipe 10 through which gas is injected into the preheating zone 1 and the heating zone 2 is formed on the bottom surface of the furnace, and the upper discharge pipe 11 is formed on the ceiling of the furnace. Since high-temperature air tends to rise upward, gas introduced through the supply pipe 10 exchanges heat with a material and can be naturally discharged through the upper discharge pipe 11.

Gas discharged to the outside through the upper discharge pipe 11 can be easily discharged by a blower 12.

In the case of the heat treatment apparatus, when gas discharge does not occur quickly, the heat treatment effect of a material by the heat treatment apparatus may be reduced, and thus the heat treatment apparatus is configured to have two upper discharge pipes 11 so that gas can be discharged relatively rapidly.

A temperature detection sensor that can measure the temperature of discharged gas may be attached on one side of the upper discharge pipes 11, and the temperature of gas discharged from the two upper discharge pipes 11 is averaged. It is preferable that when the temperature of the gas is relatively low, the flow rate of gas supplied from the supply pipe 10 and discharged from the upper discharge pipes 11 is reduced, and when the temperature of the gas is relatively high, the flow rate of the gas to be supplied and exhausted is increased.

When temperature deviation, gas distribution deviation, and gas pressure deviation, etc. are reduced, the heat treatment quality of materials becomes homogeneous. In addition, when the temperature deviation and the gas pressure deviation, etc. are reduced, the inner space of the furnace in which materials are received may be expanded. When the expanded inner space is provided, it is possible to increase the number of the materials injected into the furnace, which is advantageous for mass production.

In a lithium secondary battery, a cathode active material is dependent on a material preparation method prior to synthesis and a synthesis process. For mass production, a method of producing a cathode active material by a solid phase reaction by using a sintering furnace is being adopted.

The sintering furnace process of using the heat treatment apparatus is a method in which a precursor, which is first made into powder and mixed well, is put into a porous ceramic container (the sagger) and synthesized in the sintering furnace of a high-temperature atmosphere. Since the particle size, distribution, and structure of obtained cathode active materials vary depending on temperature, atmosphere gas, and synthesis time in the sintering furnace, it is very important to control temperature distribution and flow condition of reactant gas inside the sintering furnace.

Cathode active materials such as LiCoO2 (lithium cobalt oxide) are easy to be synthesized, have gradual change in potential, and have excellent conductivity, and thus are mainly used in secondary batteries.

Referring to FIGS. 1 and 2, the discharge pipe 11, 13, which discharges gas inside the furnace body 30 to improve the deviations of the gas distribution and temperature inside the furnace, may be formed in an upstream section corresponding to a partial section of a side close to the heating zone 2 in the maintenance zone 3 and in the heating zone 2.

The discharge pipe 11, 13 may be composed of the plurality of upper discharge pipes 11 provided on the ceiling of the furnace body 30, and the lower discharge pipe 13 formed on the bottom surface of the furnace body 30.

For example, the upper and lower discharge pipes 11 and 13 may be formed in the entire area of the heating zone 2. Specifically, the upper and lower discharge pipes 11 and 13 are spaced apart at a predetermined interval from each other and may be disposed in an inlet or outlet area of the heating zone 2. In addition, the upper discharge pipe 11 and the lower discharge pipe 13 may be further formed in the maintenance zone 3. For example, each of the upper and lower discharge pipes 11 and 13 may be formed in a part of the maintenance zone 3. Specifically, the upper and lower discharge pipes 11 and 13 may be further formed in the upstream section u of the maintenance zone 3. Accordingly, in each of the heating zone 2 and the maintenance zone 3, a temperature distribution deviation for a process can be minimized, impurity gas can be effectively discharged, and a phenomenon in which the partial pressure of oxygen is lowered can be minimized. Unlike this, the discharge pipes 11 and 13, which discharge gas in the furnace body 30 to improve the distribution deviation of the gas supplied to the inside of the furnace, may be formed in the upstream section corresponding to a partial section of a side close to the heating zone 2 in the maintenance zone 3 and in the heating zone 2.

The lower discharge pipes 13 may be formed across the heating zone 2 and the upstream section u. The upper discharge pipe 11 may be formed only in a middle section (c) of the heating zone 2 among sections between the heating zone 2 and the upstream section u. The upper discharge pipe 11 may be excluded from each of the inlet part and outlet part of the heating zone 2.

In the middle section (c) of the heating zone 2, various exhaust gases lighter than air may be generated. The corresponding impurity gases may be discharged to the outside through the upper discharge pipe 11 formed in the section (c).

When the upper discharge pipes 11 are installed across the heating zone 2 and the upstream section (u), oxygen may be excessively discharged through the upper discharge pipes 11 and thus the partial pressure of oxygen may be lowered. According to the embodiment of the present disclosure, the upper discharge pipe 11 is formed only in the section (c), and thus the phenomenon of lowering the partial pressure of oxygen may be minimized.

Due to the upper discharge pipe 11 formed only in the section (c), the decrease of the partial pressure of oxygen is prevented. Since the partial pressure of carbon dioxide is sufficiently lowered by the lower discharge pipes 13 formed throughout the heating zone 2 and the upstream section (u), the particle size of LiCoO2 is reduced and the synthesis reaction of LiCoO2 may proceed efficiently.

Based on a third direction (a z-axis direction), the upper discharge pipe 11 and the lower discharge pipe 13 may not overlap or partially overlap each other. When the upper discharge pipe 11 and the lower discharge pipe 13 partially overlap each other, the upper discharge pipe 11 may overlap the lower discharge pipe 13 within a range of 15% or less thereof (based on the second direction (a y-axis direction)).

In addition, based on a first direction (an x-axis direction), the upper discharge pipe 11 and the lower discharge pipe 13 may have different widths. For example, the upper discharge pipe 11 may have a smaller width than the width of the lower discharge pipe 13.

In addition, the upper discharge pipe 11 may include an inclined first surface 11*a* communicating with the inside of the furnace body 30, and a second surface 11*b* having the constant width of the first direction (the x-axis direction) toward the upper outside of the furnace body 30 along the third direction (the z-axis direction) from the first surface 11*a*. In addition, based on a height direction, which is the third direction, the height of the first surface 11*a* may be lower than the height of the second surface 11*b*. More specifically, the height of the first surface 11*a* may be preset to be 50% or less of the height of the second surface 11*b*.

The upper discharge pipe 11, which has the inclined first surface 11*a*, includes a plurality of upper discharge pipes in the third direction, and thus when atmospheric gas, which is a fluid inside the furnace body 30, is discharged, the rapid change of the flow rate of the atmospheric gas can be controlled. Accordingly, the atmospheric gas supplied into the furnace body 30 can flow stably, and accordingly, a material in the sagger 5 introduced into the furnace body 30 can be better heat treated. In addition, gas distribution inside the furnace body 30 can be uniform, and temperature deviation inside the furnace body 30 can be reduced. The inner space of the furnace body 30 through which a material is moved can be expanded through the improvement of the uniformity of gas distribution and the reduction of temperature deviation. Accordingly, a larger number of the saggers can be transported by using the expanded space inside the furnace.

Lithium carbonate ($Li_2CO_3$), cobalt oxide ($Co_3O_4$), and oxygen ($O_2$) may exist in the heating zone 2. For example, lithium carbonate, cobalt oxide, and oxygen in gaseous states may be injected into the heating zone 2. Alternatively, lithium carbonate and cobalt oxide may be applied to a material and put into the heating zone 2 together with the material. Lithium carbonate and cobalt oxide may be materials.

The lower discharge pipe 13 can lower the partial pressure of a by-product of chemical reaction between lithium carbonate, cobalt oxide, and oxygen, in particular, the partial pressure of carbon dioxide ($CO_2$).

The lower discharge pipe 13 may be formed at a position lower than the position of the material located in the furnace body 30.

In addition, the lower discharge pipe 13 may be formed at a position lower than a support means for supporting a material inside the furnace body 30. The support means may include the roller 6 for conveying a material.

Carbon dioxide heavier than air descends inside the furnace body 30 and may be discharged to the outside through the lower discharge pipe 13. Due to the lower discharge pipe 13 through which carbon dioxide is discharged, the partial pressure of carbon dioxide in the furnace body 30 may be lowered.

Figure 6:
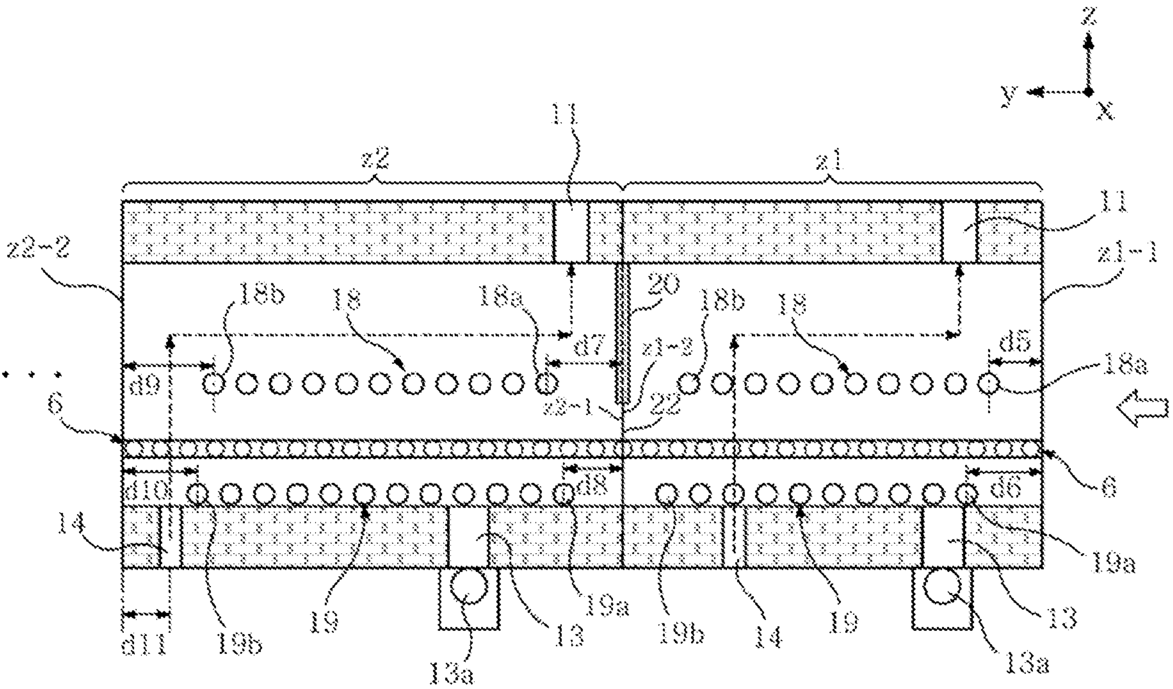
FIG. 6 is a schematic side cross-sectional view of the heat treatment apparatus of the present disclosure.

Referring to FIG. 6, the lower discharge pipe 13 provided in each zone communicates with a lower exhaust port 13*a* formed in the lower part of the furnace body 30 to discharge atmospheric gas.

The lower discharge pipe 13 may be formed at the center of the bottom of the furnace body 30 so that the partial pressure of carbon dioxide in the furnace body 30 is uniform. Specifically, when a material is conveyed along the second direction, which is the y-axis direction, the lower discharge pipe 13 may be formed at the center of the furnace body 30 in the third direction, which is the z-axis direction perpendicular to the first direction.

Figure 4:
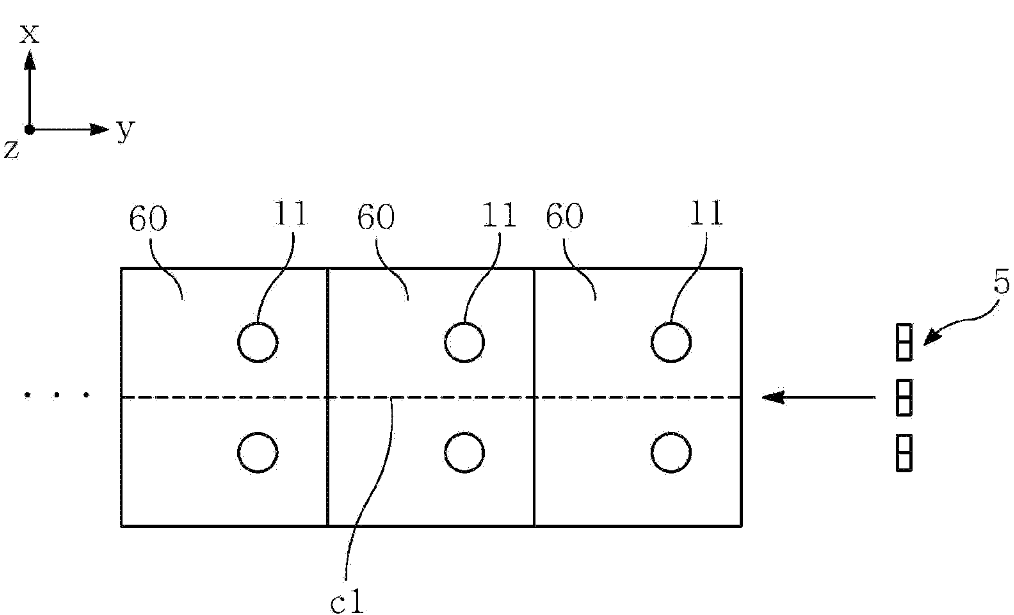
FIG. 4 is a schematic plan view illustrating the arrangement state of a plurality of furnace blocks of the heat treatment apparatus of the present disclosure.

Referring to FIG. 2 or 4, to maintain the uniformity of gas distribution, the upper discharge pipe 11 may include a plurality of upper discharge pipes formed along the first direction, which is the x-axis direction, perpendicular to the second direction, which is the moving direction of a material and is the y-axis direction. In this case, the plurality of upper discharge pipes 11 may be formed at symmetrical positions based on a center line c1 of the furnace body 30 along the first direction.

In this case, the gas distribution inside the furnace may be uniform, and the temperature deviation inside the furnace may be reduced. Through the improvement of the uniformity of gas distribution and the reduction of the temperature deviation, it is possible to expand the inner space of the furnace through which a material moves. Accordingly, a larger number of saggers can be transported by using the expanded inner space of the furnace.

The saggers 5 may be introduced into the furnace body 30 while materials are received in the saggers 5. The saggers may be formed in a special structure so that the chemical reaction of each material is not limited due to the saggers stacked in multiple layers.

Reactive gases such as oxygen and air injected from the supply pipe 10 may contact a material through the opening part formed in each of the saggers and can react chemically with the material.

Figure 3:
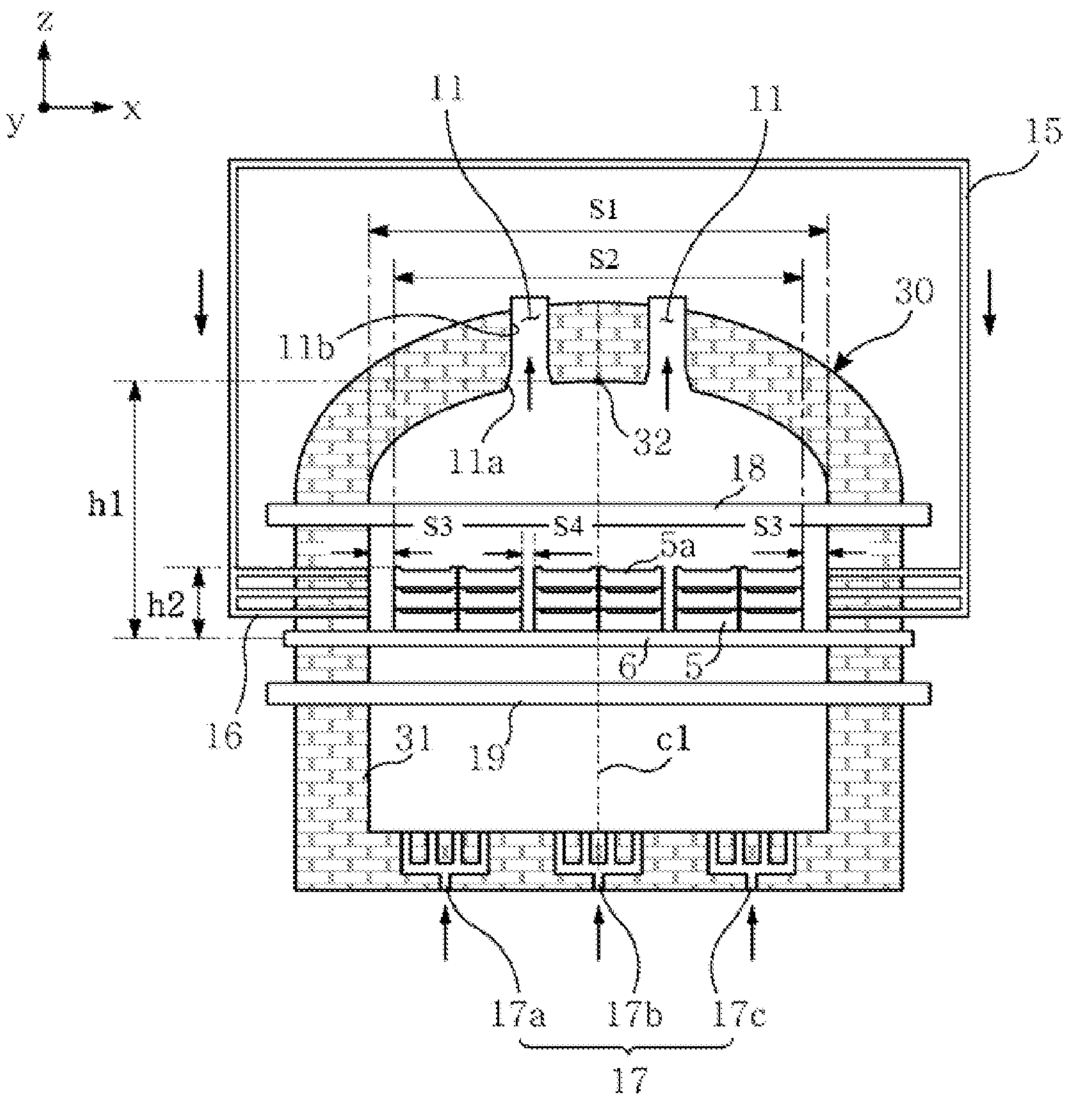
FIG. 3 is a cross-sectional view of the heat treatment apparatus of FIG. 2 viewed in a different position.

Referring to FIG. 3, in the heating zone 2, a lower supply pipe 17 for injecting high-temperature gas may be formed on the bottom surface of the furnace body 30.

The lower supply pipe 17 may include a plurality of lower supply pipes disposed at intervals in a direction (a width direction of the furnace body 30) orthogonal to the moving direction of the sagger 5 introduced into the furnace body 30 and transported.

For example, the lower supply pipe 17 may include a plurality of lower supply pipes disposed at intervals along the width direction which is the x-axis direction (the first direction) of the furnace body 30, that is, may include a first lower supply pipe 17*a*, a second lower supply pipe 17*b*, and a third lower supply pipe 17*c*.

The first lower supply pipe 17*a*, the second lower supply pipe 17*b*, and the third lower supply pipe 17*c* may constitute a unit supply pipe composed of a plurality of branch supply pipes, and gas supplied into the furnace body 30 through the second lower supply pipe 17*b* disposed in the middle among the plurality of lower supply pipes may directly move toward the ceiling of the furnace body 30 on which the upper discharge pipes 11 are formed.

In addition, gas supplied through the first lower supply pipe 17*a* and the third lower supply pipe 17*c* disposed respectively on the opposite sides of the second lower supply pipe 17*b* may move up on the inner walls 31 of the furnace and may move to the upper discharge pipes 11.

Referring to FIGS. 2 to 4, the entirety of the furnace body may be formed by connecting the plurality of furnace blocks 60, which form areas, to each other. Each of the furnace blocks 60 may include the plurality of upper discharge pipes 11 through and the lower discharge pipe 13 which gas is discharged, a side supply pipe 16 and the lower supply pipe 17 through which high temperature gas is supplied, and an upper heater 18 and a lower heater 19 as heaters which heat materials.

The plurality of upper discharge pipes 11 may be formed on the ceiling surface of the furnace body 30, and the lower discharge pipe 13 and the lower supply pipe 17 may be formed on the bottom surface of the furnace body 30.

In addition, the side supply pipe 16 may include a plurality of side supply pipes formed on the opposite side surfaces of the furnace body 30.

The side supply pipes 16 may be disposed at preset positions on the side surfaces. For example, based on the first direction (the x-axis direction, the side supply pipes 16 may be disposed in an area corresponding to the saggers 5, and may be disposed in an area not corresponding to the roller 6.

In addition, the side supply pipe 16 may include a plurality of side supply pipes provided in the third direction in proportion to the saggers 5 stacked in a plurality of layers along the third direction (the z-axis direction). That is, for example, in proportion to a case in which the saggers 5 stacked in three layers are formed, three side supply pipes 16 may be disposed to be spaced apart from each other.

The upper heater 18 may be disposed at a position higher than the sagger 5 transported by the roller 6 so that the upper heater 18 is spaced apart from the sagger 5, and the lower heater 19 may be disposed at a side under the roller 6 so that the lower heater 19 is spaced apart from the roller 6. For example, the lower heater 19 may be disposed closer to the roller 6 than the upper heater 18.

The plurality of side supply pipes 16 may be connected to a side supply connection pipe 15 so that high temperature gas can be supplied.

Here, the present disclosure is characterized in that an arrangement relationship between the saggers 5 installed inside the furnace body 30 and the roller 6 transporting the saggers 5 is improved.

The saggers 5 may be arranged in a plurality of rows along the first direction, which is the x-axis direction (the width direction of the furnace), and may be transported by being stacked in multiple layers along the third direction (the height direction of the furnace), which is the z-axis direction. That is, the first direction may be a direction in which the saggers are arranged in a row, and the third direction may be a direction in which the saggers are arranged in a layer.

As the transport distance of the saggers 5 increases, the good alignment of the saggers 5 may not be maintained when the saggers 5 are arranged in a plurality of rows and layers. In addition, in this case, the characteristic of temperature uniformity inside the furnace is deteriorated, and thus temperature deviation may occur according to each area of the first to the third direction. In this case, heat energy provided to each of the plurality of saggers 5 may be different, and because of this, the physical properties of materials provided inside the saggers 5 may be different from each other.

Accordingly, according to the present disclosure, through the size of the furnace body 30, and an arrangement relationship between the roller 6 and the saggers 5, the alignment of the saggers 5 is not easily disturbed to provide uniform heat thereto even if the saggers 5 are arranged in a plurality of layers and rows and transported, thereby improving temperature distribution inside the furnace.

In detail, based on the third direction (the z-axis direction), the roller 6 may be spaced apart from the upper heater 18 and the lower heater 19 at different intervals. For example, the roller 6 may be disposed closer to the lower heater 19 rather than the upper heater 18 in consideration of the flow characteristics of supplied and discharged fluids and the characteristics of uniformity of thermal energy provided to the plurality of saggers 5.

In addition, a distance between the inner walls 31 in the first direction (the width direction) which is the x-axis direction of the furnace body 30 may be defined as a first distance s1, a distance of the saggers 5 of the first direction of the furnace body 30 may be defined as a second distance s2, a distance between the opposite ends of the sagger 5 and the inner walls 31 of the furnace body 30 may be defined as a third distance s3, and a distance between sagger unit bodies 5*a* composed of saggers disposed in at least one pair of rows and a plurality of layers among the saggers disposed in a plurality of rows and layers may be defined as a fourth distance s4.

In addition, when height between the center of the roller 6 and an uppermost surface 32 of a ceiling surface inside the furnace body 30 along the third direction which is the z-axis direction is defined as a first height h1, and height between the center of the roller 6 and the top of the saggers 5 stacked in a plurality of layers along the third direction which is the z-axis direction is defined as a second height h2, the following ratio relationship may be preset.

The ratio of the second distance s2 to the first distance s1 may be preset to be 80% to 95%, more preferably 85% to 95%, and even more preferably 90% to 95%. That is, the ratio of s2/s1 may be preset to be 80% to 95%, 85% to 95%, or 90% to 95% (a first reference).

A ratio of the third distance s3 to the first distance s1 may be preset to 1% to 10%, preferably 1% to 5%. That is, s3/s1 may be preset to be 1% to 10% or 1% to 5% (a second reference).

In addition, the ratio of the second height h2 to the first height h1 may be preset to be 20% to 40%, more preferably 25% to 35%, and even more preferably 28% to 35%. That is, the ratio of h2/h1 may be preset to be 20% to 40%, 25% to 35%, or 28% to 35% (a third reference).

When at least one of the first to third references is satisfied, uniform heat source may be provided to the sagger 5 disposed in at least one row and layer and a material disposed inside the sagger 5, and the saggers 5 may be disposed in various rows and layers.

In other words, when the first direction (the x-axis direction) which is the width direction of the furnace body 30, is called a row direction, and the third direction (the z-axis direction) which is the height direction of the furnace body 30 is called a layer direction, the saggers 5 may be disposed in multiple number of rows and layers.

Meanwhile, when n number of the saggers 5 are arranged in the row direction (the first direction, the x-axis direction) inside the furnace, some saggers of the n saggers 5 facing each other in the first direction may be in contact with each other in the first direction to constitute sagger unit bodies 5*a*. In this case, when the number of the sagger unit bodies 5*a* is m, m may be half the n. That is, m may be n/2.

When n number of the saggers 5 are all spaced apart from each other in the first direction, the length of the width direction which is the first direction of the furnace increases, and when n number of the saggers 5 are all in contact with each other in the first direction, the alignment of the saggers 5 may be disturbed when the saggers 5 are transported due to the rotation of the roller 6. When all of the saggers 5 arranged in a plurality of rows and layers are transferred while being in contact with each other, each of the saggers may be influenced by each other due to vibration that may occur during the transfer, and thus the alignment of the saggers may be disturbed.

For example, as illustrated in FIG. 3, each sagger unit body 5*a* having 2×3 saggers stacked (saggers arranged in two rows in the x-axis direction which is a row direction and saggers stacked in three layers in the z-axis direction which is the layer direction) may be disposed to be spaced apart from each other.

In detail, on the roller 6, a first sagger unit body, a second sagger unit body may be respectively disposed to be adjacent to the opposite inner side surfaces of the furnace, and a third sagger unit body may be disposed between the first and second sagger unit bodies. In this case, when the plurality of sagger unit bodies 5*a* are provided in contact with each other without being spaced apart from each other in the first direction (the x-axis direction), the alignment of the saggers may be improper during the transferring of the saggers.

Accordingly, each of the plurality of sagger unit bodies 5*a* may be provided at an interval of the fourth distance s4. In addition, in the first and second sagger unit bodies, the third distance s3 may have a larger value than the fourth distance s4 in order to provide uniform heat energy to the saggers 5 disposed adjacent to each of the inner surfaces of the opposite sides of the furnace. Specifically, by considering thermal energy reflected from the inner surface of the furnace, the third distance s3 may be longer than the fourth distance s4.

In addition, the ratio of the fourth distance s4 to the third distance s3 may be preset to be 15% to 30%, preferably 20% to 30%. That is, s4/s3 may be preset to be 15% to 30%, or 20% to 30% (a fourth reference).

When the ratio of the fourth distance s4 to the third distance s3 is out of the fourth reference, the length of the width direction, which is the first direction of the furnace body 30, increases, which may be inefficient and the uniformity of the temperature distribution may deteriorate. That is, in order to provide uniform heat energy to a plurality of saggers 5 disposed in an area of the inner center of the furnace body 30 and a plurality of saggers 5 disposed in an area of the inner edge of the furnace adjacent to the inner side surface of the furnace, the third and fourth distances s3, s4 may satisfy the aforementioned range.

In addition, for the efficient flow of a fluid supplied into the furnace, the upper discharge pipe 11 may be disposed in an area corresponding to an area in which the sagger unit bodies 5*a* are spaced apart from each other. Specifically, based on the third direction, the center of the upper discharge pipe 11 may be disposed to overlap the area in which the sagger unit bodies 5*a* are spaced apart from each other in the first direction.

The number of the side supply pipes 16 provided on the side surface of the furnace body 30 may be equal to or less than the number of layers in which the saggers 5 are stacked.

For example, when the number of the layers of the saggers 5 is 3, the side supply pipe 16 may include three side supply pipes, or one or two side supply pipes. In other words, the number of the side supply pipes 1 may not exceed the number of the layers of the saggers.

In addition, the side supply pipe 16 may be placed in a preset position. Specifically, the center of a side supply pipe disposed at the uppermost part based on the third direction may be disposed above the top surface of the saggers or on the same plane as the top surface. Accordingly, gas supplied through the side supply pipe 16 undergoes heat exchange with a material included in the sagger 5 disposed at the uppermost part and may be discharged naturally through the upper discharge pipe 11.

In addition, when the side supply pipe 16 also includes a plurality of side supply pipes in proportion to a case in which the saggers 5 are provided in a plurality of layers, each of the side supply pipes 16 may be disposed at a preset position.

For example, the center of a first side supply pipe disposed at a lower part closest to the roller 6 among the plurality of side supply pipes 16 may be located at a position corresponding to the sagger 5 positioned at a first layer in the first direction. In addition, the center of a second side supply pipe disposed above the first side supply pipe may be located at a position corresponding to the sagger 5 positioned at a second layer in the first direction. In addition, the center of a third side supply pipe which is disposed above the second side supply pipe and is closest to the ceiling surface of the furnace body 30 may be located at a position higher than the sagger 5 positioned at a third layer.

In this case, a third directional height between the bottom surface of the sagger 5 positioned at the third layer and the center of the third side supply pipe may be larger than a third directional height between the bottom surface of the sagger 5 positioned at the second layer and the center of the second side supply pipe.

In addition, a third directional height between the bottom surface of the sagger 5 positioned at the second layer and the center of the third side supply pipe may be larger than a third directional height between the bottom surface of the sagger 5 positioned at the first layer and the center of the second side supply pipe.

Accordingly, even when a plurality of saggers 5 are arranged in a plurality of layers on the roller 6, even heat energy may be provided to the saggers 5 and materials included in the saggers 5, and the heat treatment on the plurality of saggers 5 may be simultaneously performed, thereby improving process efficiency.

Figure 5:
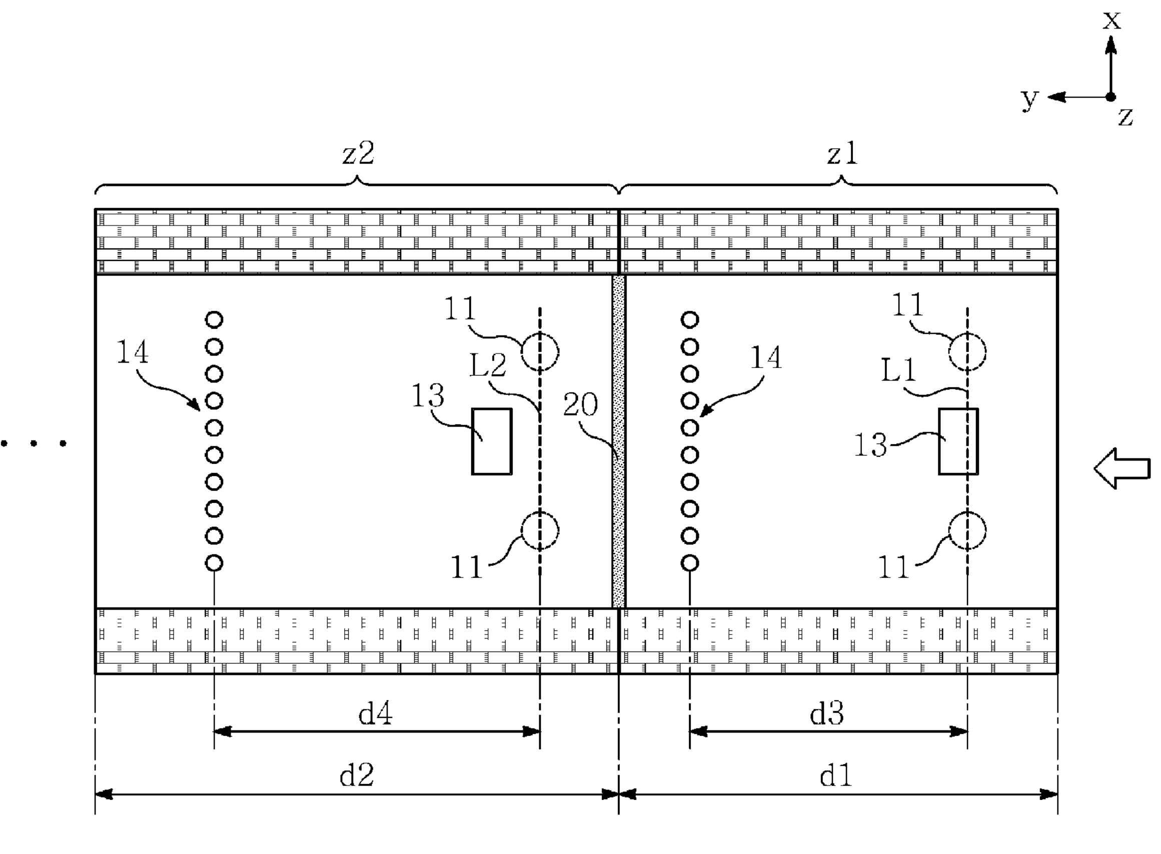
FIG. 5 is a schematic cross-sectional plan view of the heat treatment apparatus of the present disclosure.

Referring to FIGS. 5 and 6, the heat treatment apparatus of the present disclosure may include a plurality of areas. For example, the plurality of areas may be areas in which the upper and lower discharge pipes 11 and 13 are disposed in at least one zone of the heating zone 2 and the maintenance zone 3. The plurality of areas may include a first area z1 to an Nth area (N is a natural number greater than or equal to 2). The first area to the Nth area may be arranged sequentially according to the transport direction of the sagger 5. That is, the first area z1 among the plurality of areas may be an area closest to the preheating zone 1, and the Nth area among the plurality of areas may be an area closest to the cooling zone 4.

The heat treatment apparatus of the present disclosure includes the preheating zone 1 configured to preheat a material, the heating zone 2 configured to heat the material to a higher temperature than the preheating zone 1, the maintenance zone 3 configured to heat treat the material, and the cooling zone 4 configured to cool the material. The preheating zone 1, the heating zone 2, the maintenance zone 3, and the cooling zone 4 may be arranged sequentially along the second direction (the y-axis direction) which is the transport direction of the sagger 5 introduced into the furnace body 30, and the plurality of areas may be provided in at least one zone of the heating zone 2 and the maintenance zone 3.

In a case in which a zone in which the sagger 5 enters first along the second direction of the y-axis direction which is the transport direction of the sagger 5 receiving a material is referred to as the first area z1, and a next zone after the first area z1 is referred to as the second area z2, when the lengths of the first area z1 and the second area z2 in the second direction are respectively referred to as a first length d1 and a second length d2, the first length d1 may be shorter than the second length d2.

More specifically, the ratio of the first length d1 to the second length d2 may be 70% to 95%, more preferably, 75% to 95%, and even more preferably, 80% to 95%.

That is, the ratio of d1/d2 may be 70% to 95%, 75% to 95%, or 80% to 95%.

In addition, for example, assuming that there are the first area z1 to the Nth area, when the first length d1, which is the second directional length of the first area z1, is compared with the Nth length, which is the second directional length of the Nth area, the first length d1 may be the shortest, and the remaining second area z2 to the Nth area may have the same or similar lengths.

In addition, a supply port for supplying atmospheric gas may be formed in the furnace body 30 of the present disclosure.

The supply port may be composed of the plurality of lower supply pipes 14 formed at the bottom of the furnace body 30.

In this case, a plurality of lower supply pipes 14 may be formed at intervals along the first direction of the width direction, which is the x-axis direction of the furnace body 30.

In a case in which the lower supply pipes 14 are formed at each of the first area z1 and the second area z2, when a second directional length between the center of each of the lower supply pipes 14 formed in the first area z1 and the center of the upper discharge pipe 11 is defined as a third length d3, and a second directional length between the center of each of the lower supply pipes 14 formed in the second area z2 and the center of the upper discharge pipe 11 is defined as a fourth length d4, the ratio of the third length d3 to the fourth length d4 may be 65% to 95%, more preferably, 70% to 90%, even more preferably, 75% to 85%. That is, the ratio of d3/d4 may be 65% to 95%, 70% to 90%, or 75% to 85%.

In addition, in each of the second area z2 to the Nth area, the second directional length between the center of the lower supply pipe 14 and the center of the upper discharge pipe 11 may be the same or similar.

In addition, in each of the first area z1 to the Nth area, the upper discharge pipe 11 and the lower supply pipe 14 may be arranged to be misaligned from each other without being aligned with each other in the third direction, which is the height direction of the furnace body 30.

When the third and fourth lengths d3 and d4 satisfy the above range, the rapid temperature change of the sagger 5 and a material in the sagger 5 which enter the first area z1 may be prevented from occurring. In addition, the flow time and flow distance of a fluid supplied in each of the first and second areas z1 and z2 can be secured, so heat energy can be effectively provided to the material received in the sagger 5.

In other words, by making the second length d2 and the fourth length d4 in the second area z2 to the Nth area longer than the first length d1 and the third length d3 in the first area z1, the flow path of an atmospheric gas in a process in which the atmospheric gas supplied through each of the lower supply pipes 14 is discharged through the upper discharge pipe 11 may become longer, so the reaction time of the atmospheric gas with a material received in the sagger 5 may become longer. Accordingly, product quality can be improved due to sufficient reaction of the atmospheric gas with the material.

For example, when the average flow speed of an atmosphere gas is 5 m/s, the flow path of the atmosphere gas becomes longer, so the reaction time of the atmosphere gas with a material increased by 3 to 5 minutes compared to an existing heat treatment apparatus.

In addition, when drawing an imaginary line L1 passing through the center of each of the upper discharge pipes 11 in the first direction (the x-axis direction of FIG. 3) in the first area z1, a portion of the imaginary line L1 may overlap the lower discharge pipe 13 in the first direction (the x-axis direction of FIG. 3).

That is, in the first area z1, two upper discharge pipes 11 are disposed in a row along the imaginary line L1 in the first direction, and the lower discharge pipe 13 disposed between and under the two upper discharge pipes 11 may be partially included in and overlap the imaginary line L1.

In addition, when drawing an imaginary line L2 passing through the center of each of the upper discharge pipes 11 in the first direction (the x-axis direction of FIG. 3) in each of the second area z2 to the Nth area, no portion of the imaginary line L2 may overlap the lower discharge pipe 13 in the first direction (the x-axis direction of FIG. 3).

That is, in the remaining areas (the second area z2 to the Nth area) other than the first area z1, two upper discharge pipes 11 are disposed in a row along the imaginary line L2 in the first direction, and the lower discharge pipe 13 disposed between and under the two upper discharge pipes 11 may be spaced apart from the imaginary line L2 in the second direction (the y-axis direction of FIG. 3) without overlapping the imaginary line L2.

In addition, referring to FIG. 6, among a plurality of heaters disposed in the first area z1, a heater 18*a* closest to an inlet part of the first area z1 may be disposed closer to the inlet part z1-1 than the upper discharge pipe 11. That is, the upper heater 18 among the heaters disposed in the first area z1 may include a plurality of upper heaters formed at intervals along the transport direction of the material. The center of a front upper heater 18*a* closest to the inlet part z1-1 of the first area z1 among the upper heaters may be closer to the inlet part z1-1 than the center of the upper discharge pipe 11 formed on the upper part of the first area z1.

In addition, when in the first area z1, a length between the center of the front upper heater 18*a* closest to the inlet part z1-1 and the inlet part z1-1 is defined as a fifth length d5, and a length between the center of a front lower heater 19*a* closest to the inlet part z1-1 among the lower heaters 19 and the inlet part z1-1 is defined as a sixth length d6, the fifth length d5 may be shorter than or equal to the sixth length d6. That is, the relationship of d5≤d6 may be set.

Accordingly, the front upper heater 18*a* of the upper heaters 18 may be disposed closer to the inlet part z1-1 than the front lower heater 19*a* of the lower heaters 19, or the front upper heater 18*a* and the front lower heater 19*a* may be disposed in the same distance from the inlet part z1-1.

For example, the fifth length d5 may be 70% to 100% of the sixth length d6. When the fifth and sixth lengths d5 and d6 satisfy the above-described range, the rapid temperature change of the sagger 5 and a material entering the first area z1 may be prevented from occurring.

In addition, in the first area z1, a heater closest to an outlet part z1-2 may be disposed closer to the outlet part z1-2 than the lower supply pipe 14. In the embodiment of the present disclosure, the heater closest to the outlet part z1-2 among the upper heaters 18 and the lower heaters 19 disposed inside the first area z1 is a rear lower heater 19*b* of the lower heaters 19, and the center of the rear lower heater 19*b* may be closer to the outlet part z1-2 than the center of the lower supply pipe 14.

The inlet part z1-1 in the first area z1 may be a place through which a material enters, and the outlet part z1-2 may be a place through which the entered material is discharged.

In addition, among heaters (the upper heaters 18 and the lower heaters 19) disposed in the second area z2, a heater closest to the inlet part z2-1 may be disposed farther from the inlet part z2-1 than the upper discharge pipe 11. In other words, a heater closest to the inlet part z2-1 of the second area z2 may be the front lower heater 19*a* among the lower heaters 19. In the second area z2, the center of the front lower heater 19*a* may be farther from the inlet part z2-1 than the center of the upper discharge pipe 11.

In addition, looking at the arrangement relationship of the front upper heater 18*a* and the front lower heater 19*a*, which are closest to the inlet part z2-1, in the upper heater 18 and the lower heater 19 provided in the second area z2, when length between the center of the front upper heater 18*a* and the inlet part z2-1 of the second area z2 is defined as a seventh length d7, and length between the center of the front lower heater 19*a* and the inlet part z2-1 of the second area z2 is defined as an eighth length d8, the seventh length d7 may be longer than or equal to the eighth length d8, that is, d7≥d8.

Accordingly, the front upper heater 18*a* of the upper heater 18 may be disposed at a position farther from the inlet part z2-1 than the front lower heater 19*a* of the lower heater 19, or the front upper heater 18*a* and the front lower heater 19*a* may be disposed at positions away by the same distance from the inlet part z2-1.

For example, the eighth length d8 may be between 70% and 100% of the seventh length d7. When the seventh and eighth lengths d7 and d8 satisfy the above-mentioned range, uniform heat energy may be provided to the sagger 5 passing through the first area z1 and entering the second area z2, and temperature deviation between the second area z2 and the Nth area may be minimized.

In addition, in a case in which among the upper heaters 18 in the second area z2, a heater closest to an outlet part z2-2 is referred to as a rear upper heater 18*b*, and among the lower heaters 19 in the second area z2, a heater closest to the outlet part z2-2 is referred to as the rear lower heater 19*b*, when a length between the outlet part z2-2 and the center of the rear upper heater 18*b* is defined as a ninth length d9, and a length between the outlet part z2-2 and the center of the rear lower heater 19*b* is defined as a tenth length d10, the ninth length may be longer than the tenth length.

That is, the relationship of d9>d10 may be set. Accordingly, in the second area z2, the rear upper heater 18*b* of the upper heaters 18 may be disposed farther from the outlet part z2-2 than the rear lower heater 19*b* of the lower heaters 19.

In addition, when length between the outlet part z2-2 and the center of the lower supply pipe 14 in the second area z2 is defined as an eleventh length d11, the eleventh length d11 may be shorter than the ninth length d9 and/or the tenth length d10. That is, the relationship of d11〈d9 and/or d10 may be set. In other words, the relationship of d11〈d10〈d9 may be set.

A partition wall 20 may be formed between the first area z1 and the second area z, that is, at a position which is the outlet part z1-2 of the first area z1 and the inlet part z2-1 of the second area z2.

The partition wall 20 may be formed in the form of a partition and may be formed along the first direction, which is the width direction, between the first area z1 and the second area z2 to block the first area z1 from the second area z2. The partition wall 20 is formed shorter than the entire height of each of the areas in the third direction of the height direction, which is the z-axis direction, and thus an opening part 22 may be formed such that a portion between the areas is open in the height direction so that a material can pass through the open portion. In addition, although not shown in the drawing, the partition wall 20 may be further disposed at a boundary of each of the second area z2 to the Nth area.

According to the present disclosure, in a plurality of areas as described above, an arrangement relationship between the upper discharge pipe 11, the lower discharge pipe 13, the lower supply pipe 14, the upper heater 18, and the lower heater 19 is preset, so gas distribution can be uniform and temperature deviation can be reduced in the furnace. Through the improvement of the uniformity of gas distribution and the reduction of temperature deviation, it is possible to expand space inside the furnace through which materials move. Therefore, a larger number of saggers can be transported by using the expanded inner space of the furnace.

In addition, according to the present disclosure, when the sagger 5 enters an area in which the upper and lower discharge pipes 11, 13 are disposed, the sudden temperature change of the sagger 5 and a material stored in the sagger 5 can be prevented, and the distance and time of the flow of a fluid can be secured so that heat energy can be effectively provided to the sagger 5.

In other words, when an atmospheric gas supplied from the lower supply pipe 14 to the inside of the furnace body 30 reacts with a material and is discharged to the outside through the upper discharge pipe 11, the flow distance of the atmospheric gas may be long, so it is possible to increase the reaction time of the atmospheric gas with the material and improve product quality accordingly.

In addition, when an atmospheric gas is not discharged efficiently through the upper discharge pipe 11, the atmospheric gas can be discharged through the lower discharge pipe 13, so product quality can be maintained to be good.

Features, structures, and effects, etc. described in the embodiments above are included in at least one embodiment of the present disclosure, and are not necessarily limited to only one embodiment. In addition, each embodiment having the features, structures, and effects, etc. of may be combined or modified with respect to other embodiments by those skilled in knowledge in the field to which the embodiments belong. Accordingly, contents related to the combination and modification should be construed as being included in the scope of the present disclosure.

In addition, although the above has been described with reference to the embodiment, this is only an example and does not limit the present disclosure, and those having ordinary knowledge in the technical field to which the present disclosure belongs will know that various modifications and applications not exemplified above are possible without departing from the essential characteristics of the present embodiment. For example, each component specifically shown in the embodiment may be modified and implemented. In addition, differences related to these modifications and applications should be construed as being included in the scope of the present disclosure defined in the appended claims.

What is claimed is:

1. A heat treatment apparatus comprising:

a furnace body in which materials are transferred and heat treated;

a roller disposed inside the furnace body and configured to transfer saggers in which the materials are received;

a heater disposed inside the furnace body, the heater being disposed at a position spaced apart from the saggers and configured to heat the materials;

an upper discharge pipe disposed on an upper part of the furnace body;

a lower discharge pipe disposed on a lower part of the furnace body; and a lower supply pipe disposed on the lower part of the furnace body, wherein the furnace body comprises a plurality of areas having the upper discharge pipe and the lower discharge pipe, wherein the upper discharge pipe and the lower discharge pipe discharge an atmospheric gas from the furnace body and the lower supply pipe supplies the atmospheric gas into the furnace body, wherein a first direction is a width direction of the furnace body, wherein the plurality of areas comprising a first area to an Nth area (N is a natural number greater than or equal to 2) disposed sequentially along a second direction which is a transport direction of each of the materials, wherein the second direction is perpendicular to the first direction, wherein, in the second direction, a first length of the first area is shorter than a second length of a second area, wherein, in the second direction, a third length between a center of the lower supply pipe formed in the first area and a center of the upper discharge pipe formed therein is shorter than a fourth length between a center of the lower supply pipe formed in the second area or in each of the second area to the Nth area and a center of the upper discharge pipe formed therein, and wherein in each of the first area to the Nth area, the upper discharge pipe and the lower supply pipe are not arranged in a straight line in a third direction which is a height direction to be misaligned from each other.

2. The heat treatment apparatus of claim 1, wherein a ratio of the first length to the second length is 70% to 95%.

3. The heat treatment apparatus of claim 1, wherein lengths of the second area to the Nth area in the second direction are equal to each other.

4. The heat treatment apparatus of claim 1, wherein the lower discharge pipe is formed on the lower part of the furnace body, and wherein the lower discharge pipe is disposed to partially overlap an imaginary line passing through the upper discharge pipe along the first direction on a plane in the first area.

5. The heat treatment apparatus of claim 1, wherein the lower discharge pipe is formed on the lower part of the furnace body, and when the lower discharge pipe is disposed not to overlap an imaginary line passing through the upper discharge pipe along the first direction on a plane in the second area to the Nth area.

6. The heat treatment apparatus of claim 1, wherein the lower discharge pipe is formed on the lower part of the furnace body, and wherein a ratio of the third length to the fourth length is 65% to 95%.

7. The heat treatment apparatus of claim 1, wherein the heater comprises:

a plurality of upper heaters disposed above the transferred saggers by being spaced apart from each other, and a plurality of lower heaters disposed under the transferred saggers by being spaced apart from each other, wherein in the first area, a heater closet to an inlet part of the first area is disposed closer to the inlet part than the upper discharge pipe.

8. The heat treatment apparatus of claim 1, wherein the heater comprises:

a plurality of upper heaters disposed above the transferred saggers by being spaced apart from each other, and a plurality of lower heaters disposed under the transferred saggers by being spaced apart from each other, wherein a fifth length between a center of a front upper heater closest to an inlet part of the first area among the plurality of upper heaters and the inlet part of the first area is shorter than a sixth length between a center of a front lower heater closest to the inlet part of the first area among the plurality of lower heaters and the inlet part of the first area.

9. The heat treatment apparatus of claim 1, wherein the heater comprises:

a plurality of upper heaters disposed above the transferred saggers by being spaced apart from each other, and a plurality of lower heaters disposed under the transferred saggers by being spaced apart from each other, wherein a heater closest to an outlet part of the first area is disposed closer to the outlet part than the lower supply pipe.

10. The heat treatment apparatus of claim 1, wherein among heaters disposed in the second area, a heater closest to an inlet part of the second area is disposed farther from the inlet part of the second area than the upper discharge pipe.

11. The heat treatment apparatus of claim 1, wherein the heater comprises:

a plurality of upper heaters disposed above the transferred saggers by being spaced apart from each other, and a plurality of lower heaters disposed under the transferred saggers by being spaced apart from each other, wherein a seventh length between a center of a front upper heater, that is closest to an inlet part of the second area among upper heaters provided in the second area, and the inlet part of the second and is greater than an eighth length between a center of a front lower heater, that is closest to an inlet part of the second area among lower heaters provided in the second area, and the inlet part of the second area.

12. The heat treatment apparatus of claim 1, wherein the heater comprises:

a plurality of upper heaters disposed above the transferred saggers by being spaced apart from each other, and a plurality of lower heaters disposed under the transferred saggers by being spaced apart from each other, wherein a ninth length between a center of a rear upper heater, that is closest to an outlet part of the second area among a plurality of upper heaters provided in the second area, and the outlet part of the second area is greater than a tenth length between a center of a rear lower heater, that is closest to an outlet part of the second area among a plurality of lower heaters provided in the second area, and the outlet part of the second area.

13. The heat treatment apparatus of claim 1, wherein a ratio of a second distance between opposite ends of the saggers to a first distance between inner walls of the furnace body in the first direction is 80% to 95%.

14. The heat treatment apparatus of claim 1, wherein a ratio of a second height of the saggers stacked in a plurality of layers along the third direction to a first height between a center of the roller and an uppermost surface of a ceiling surface inside the furnace body along the third direction is 20% to 40%.

15. The heat treatment apparatus of claim 1, wherein some saggers among the saggers that are disposed in n rows in the first direction are in contact with each other to constitute sagger unit bodies, wherein the number of the sagger unit bodies is half the number of the n rows.

* * * * *